United States Patent Office 3,011,488
Patented Dec. 5, 1961

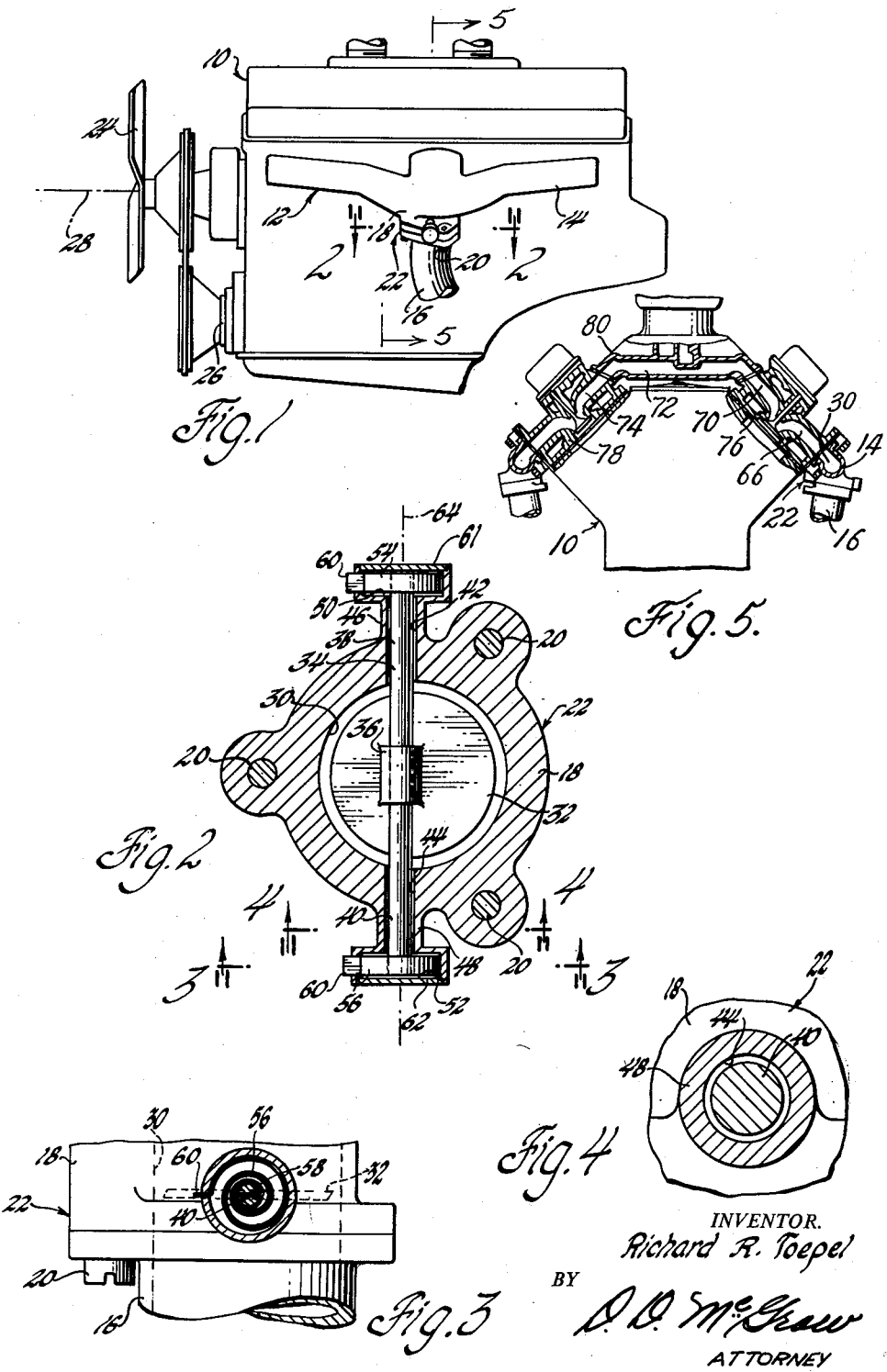

3,011,488
EXHAUST HEAT CONTROL VALVE ASSEMBLY
Richard R. Toepel, Warren, Mich., assignor to General Motors Corporation, Detroit, Mich., a corporation of Delaware
Filed June 21, 1960, Ser. No. 37,647
5 Claims. (Cl. 123—122)

The invention relates to a valve assembly and particularly to a manifold heat valve assembly which may be used to control manifold heat in an internal combustion engine during engine warm-up. An exhaust manifold heat valve is commonly used on internal combustion engines to by-pass exhaust gases through the engine intake manifold during the engine warm-up period so that the fuel-air mixture being introduced into the engine cylinders is preheated and the intake manifold does not tend to condense the fuel prior to its introduction into the combustion chambers. A valve typical of those now being used for this purpose includes a butterfly valve attached to a stainless steel shaft which in turn rotates in two stainless steel bushings provided in the exhaust manifold. The degree of rotation is controlled by an external bi-metallic coil spring and weight system. As the coil spring is heated during engine warm-up, it tends to move the butterfly valve so that it overcomes the weight and opens the valve. Until the valve is opened, a substantial quantity of engine exhaust gases is by-passed through the engine intake manifold for heating purposes. While such systems are satisfactory when operating properly, they have been found to become inoperative after a period of time because of the extreme temperatures to which the shaft and bushings are exposed. It is difficult to keep the contact areas properly lubricated and the shaft may seize in the bushings after a limited period of operation. Since the thermostatic coil spring operates at relatively low temperatures, it has to be constructed of light gage metal so that the proper valve movement is obtained with relatively small temperature change. Thus it exerts insufficient force to cause the seized shaft to break away from the bushings.

The mechanism embodying the invention overcomes the seizure problem inherent in the current designs and also permits stronger thermostatic springs to be used. Instead of using rubbing contact bushings, the butterfly valve and shaft assembly is suspended by two bi-metallic coil springs and the entire assembly is enclosed in a housing. The springs then operate to support as well as to control the position of the butterfly valve. They are also subjected to greater operating temperature differentials than the type commonly being used at present and can therefore be constructed of heavier gage metal. This provides a sufficiently strong supporting system and also greater rotational torque.

FIGURE 1 is a side view of an internal combustion engine having a manifold valve assembly embodying the invention.

FIGURE 2 is a section view through a portion of the exhaust system of the engine of FIGURE 1 taken in the direction of arrows 2—2 of that figure.

FIGURE 3 is a view of a portion of the mechanism embodying the invention as taken in the direction of arrows 3—3 of FIGURE 2 and having parts broken away and in section.

FIGURE 4 is a view taken in the direction of arrows 4—4 of FIGURE 2 and having parts broken away and in section.

FIGURE 5 is a cross section view of the engine of FIGURE 1 taken in the direction of arrows 5—5, omitting details of the engine block system and having parts broken away.

The internal combustion engine 10 may be of any suitable type and for purposes of illustration is shown as being of a type commonly used in automotive vehicles. It is provided with an exhaust system 12 including an exhaust manifold 14 which is attached to one side of the engine 10 and an exhaust pipe 16 which conducts exhaust gases from the manifold 14 to the atmosphere through other appropriate parts of a typical exhaust system. Pipe 16 is attached to manifold outlet 18 by means of suitable bolts 20. A similar exhaust manifold and exhaust pipe is provided on the other side of the engine. A manifold heat valve assembly 22 is provided in manifold outlet 18, which acts as a heat valve assembly housing. The engine may also have a fan 24 driven from the engine crankshaft 26 and having a fan axis 28. In normal operation the fan draws cooling air through the radiator and forces this air along the sides of the engine 10. The air therefore provides additional cooling of the engine and will also tend to cool the thermosensitive portions of the manifold heat valve assembly 22.

The manifold outlet 18 includes the exhaust gas passage 30 in which the manifold heat valve 32 is received. Valve 32 is secured to valve shaft 34 by any suitable means such as the displaced valve section 36. Shaft 34 extends on either side of the valve 32 and its ends provide trunnions 38 and 40. The trunnions or shaft ends extend through the valve housing 18 and occupy passages 42 and 44, respectively. These passages are coaxial and are formed through opposite sides of housing 18. They may extend through neck sections 46 and 48 which are integral with the housing. Passages 42 and 44 are substantially greater in diameter than trunnions 38 and 40 so that a relatively large clearance is provided at all times between the passage walls and the shaft 34. Chambers 50 and 52 are provided in housing 18 at the outer ends of the neck sections 46 and 48 and receive thermosensitive elements 54 and 56 therein. These elements are formed of suitable materials which are well known and may be constructed as bi-metallic springs that are preferably spiral or otherwise coiled as is best seen in FIGURE 3. They have their inner ends 58 secured to the trunnions 38 and 40, respectively. Their outer ends 60 are secured to the walls of chambers 50 and 52 so that they support valve 32 and shaft 34 in position in housing 18 and in spaced relation to all portions thereof. Chambers 50 and 52 may be closed by suitable plugs 61 and 62. Exhaust gases leave the engine cylinders through exhaust passages 66 controlled by exhaust valves 68 and enter passage 30. When the engine is cold, valve 32 will be substantially closed and most of these exhaust gases will pass through the exhaust crossover passages 70, 72 and 74 in the cylinder heads 76 and 78 and intake manifold 80 to heat the fuel-air mixture going to the cylinders. Some of the exhaust gases passing through passage 30 will also be received in passages 42 and 44 and chambers 50 and 52. These gases will expose elements 54 and 56 to higher temperatures than heretofore so that they expand or contract by uncoiling or coiling action so as to rotate shaft 34 and valve 32 in accordance with the exhaust gas temperatures as well as ambient temperature. They can therefore be constructed of heavier gage metal which will provide a sufficiently stiff supporting system and also produce a substantially greater rotational torque. Since the valve and shaft are entirely supported by the springs, there is no binding action between shaft 34 and housing 18 and the valve and valve shaft remain free to rotate directly under the influence of relatively high torque produced by the springs.

The springs are indirectly exposed to the flow of air created by the fan 24 as well as the forward motion of the vehicle. Since, in the usual vehicle construction, this air is being heated by the radiator, the springs respond to the amount of heat being given off by the engine. As the air passing by the spring chambers 50 and 52 increases in temperature due to engine warm-up, the springs expand and rotate shaft 34 so as to open valve 32 and decrease the amount of exhaust gases being bypassed through the engine intake manifold crossover passage 72.

By orienting the valve shaft axes 64 in a direction directly normal to the fan axis 28, and therefore generally transverse to the direction of air flow, each of the springs 54 and 56 is exposed to air currents having substantially the same temperature and air flow conditions and a minimum spring temperature differential is obtained.

What is claimed is:

1. An exhaust heat valve assembly for an internal combustion engine having an exhaust manifold, said assembly comprising, a housing forming a portion of said exhaust manifold, a valve, a valve shaft supporting said valve and having the ends thereof received through and spaced from the walls of said housing, passages formed in said housing and receiving said shaft ends, a pair of spirally formed thermosensitive springs each having an inner end secured to one of the ends of said shaft and an outer end secured to said housing, said springs being enclosed by said housing and supporting said valve and said valve shaft in said housing and being subject to temperature variations to expand and contract and move said valve by rotating said shaft.

2. In an internal combustion engine comprising an intake manifold having an exhaust crossover passage and an exhaust manifold and an engine cooling fan rotatable about a fan axis, an exhaust heat valve positioned in said manifold for bypassing exhaust gases through said intake manifold exhaust crossover passage during engine warm-up, first and second thermosensitive elements supporting and controlling said valve in accordance with engine temperature, said thermosensitive elements having a common axis extending through said valve and at substantially right angles to said fan axis so that said thermosensitive elements are equally exposed to air currents generated by said fan.

3. In combination, a valve, a shaft secured to and supporting said valve, first thermosensitive spring means and second thermosensitive spring means respectively secured to said shaft on opposite sides of said valve and supporting said shaft and said valve, and a housing completely enclosing said spring means and said shaft and said valve in spaced relation to said shaft and said valve and said spring means and providing anchor means for said spring means.

4. In combination, a valve, coaxial oppositely extending spaced trunnions on said valve, a housing for said valve and said trunnions having trunnion-receiving passages formed therein of substantially greater diameter than the diameter of said trunnions, chambers respectively connecting with the outer ends of said passages, and coil torsion springs received within said chambers and having their outer ends secured to said housing and their inner ends secured to said trunnions to support said valve and said trunnions in said housing.

5. The combination of claim 4, said housing forming a portion of an internal combustion engine exhaust system and said torsion springs being thermosensitive to move said valve under influence of changes in heat sensed by said springs.

References Cited in the file of this patent

UNITED STATES PATENTS

| | | |
|---|---|---|
| 2,226,011 | Murphy | Dec. 24, 1940 |
| 2,385,096 | McCollum | Sept. 18, 1945 |
| 2,394,747 | Campbell | Feb. 12, 1946 |
| 2,470,503 | Levine | May 17, 1949 |
| 2,603,199 | Moseley | July 15, 1952 |
| 2,664,862 | Walker | Jan. 5, 1954 |